United States Patent
Takahashi

(10) Patent No.: US 10,338,792 B2
(45) Date of Patent: Jul. 2, 2019

(54) OBJECT STOP POSITION CONTROL METHOD, ACTION INDICATING DEVICE, AND PROGRAM

(71) Applicant: Konica Minolta, Inc., Chiyoda-ku (JP)

(72) Inventor: Masao Takahashi, Fuchu (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 139 days.

(21) Appl. No.: 14/573,026

(22) Filed: Dec. 17, 2014

(65) Prior Publication Data

US 2015/0193109 A1 Jul. 9, 2015

(30) Foreign Application Priority Data

Jan. 6, 2014 (JP) ................................ 2014-000623

(51) Int. Cl.
*G06F 3/0484* (2013.01)
*G06F 3/0485* (2013.01)
*G06F 3/0488* (2013.01)

(52) U.S. Cl.
CPC ........ *G06F 3/04847* (2013.01); *G06F 3/0488* (2013.01); *G06F 3/04855* (2013.01)

(58) Field of Classification Search
CPC .................................................. G06F 3/04847
USPC ......................................................... 715/833
See application file for complete search history.

(56) References Cited

U.S. PATENT DOCUMENTS

| | | | | |
|---|---|---|---|---|
| 6,215,490 B1* | 4/2001 | Kaply | ................... | G06F 3/0481 715/788 |
| 6,882,354 B1* | 4/2005 | Nielsen | ................... | G06F 3/013 715/784 |
| 7,765,491 B1* | 7/2010 | Cotterill | ................ | G06F 3/0485 345/156 |
| 9,021,386 B1* | 4/2015 | Rasmussen | ............. | G06F 3/002 715/785 |
| 9,170,721 B2* | 10/2015 | Kim | .................... | G06F 3/04855 |
| 2002/0145631 A1* | 10/2002 | Arbab | ................. | G06F 3/04855 715/786 |

(Continued)

FOREIGN PATENT DOCUMENTS

JP 2005-317003 11/2005
JP 2006-189989 A 7/2006

(Continued)

OTHER PUBLICATIONS

Notification of Reasons for Rejection issued in corresponding Japanese Patent Application No. 2014-000623; dated Oct. 16, 2015; with English translation (10 pages).

*Primary Examiner* — Daniel Rodriguez
(74) *Attorney, Agent, or Firm* — Buchanan Ingersoll & Rooney

(57) ABSTRACT

An object stop position control method includes: when a movement instruction as to an object displayed on a display unit is received by a first operation method, moving the object in accordance with the movement instruction, stopping the movement of the object based on the movement instruction when the object moves past a predetermined stop position, and causing the object to automatically stop at the stop position; and, when the movement instruction is received by a second operation method, not causing the object to automatically stop, but moving the object in accordance with the movement instruction.

10 Claims, 19 Drawing Sheets

(56) References Cited

U.S. PATENT DOCUMENTS

| | | | | |
|---|---|---|---|---|
| 2003/0146938 A1* | 8/2003 | Geiger | G06F 3/0483 | 715/784 |
| 2003/0193474 A1* | 10/2003 | Yamamoto | G06F 3/04847 | 345/156 |
| 2007/0220443 A1* | 9/2007 | Cranfill | G06F 3/03547 | 715/786 |
| 2008/0168384 A1* | 7/2008 | Platzer | G06F 3/04845 | 715/784 |
| 2010/0005420 A1* | 1/2010 | Schneider | G06F 3/04812 | 715/833 |
| 2011/0175920 A1* | 7/2011 | Ieperen | G06F 1/1616 | 345/473 |
| 2012/0084685 A1* | 4/2012 | Heynen | G06F 8/38 | 715/763 |
| 2012/0139847 A1* | 6/2012 | Hunt | G06F 3/0346 | 345/173 |
| 2012/0180002 A1* | 7/2012 | Campbell | G06F 3/04883 | 715/863 |
| 2012/0229493 A1* | 9/2012 | Kim | G06F 3/04883 | 345/589 |
| 2013/0033525 A1* | 2/2013 | Markiewicz | G06F 3/0485 | 345/684 |
| 2013/0271602 A1* | 10/2013 | Bentley | H04N 7/18 | 348/143 |
| 2013/0326394 A1* | 12/2013 | Isensee | G06F 3/0481 | 715/781 |
| 2014/0310646 A1* | 10/2014 | Vranjes | G06F 9/451 | 715/788 |
| 2014/0372930 A1* | 12/2014 | Li | G06F 3/0482 | 715/772 |
| 2015/0106731 A1* | 4/2015 | Matas | G06Q 10/107 | 715/744 |
| 2016/0170625 A1* | 6/2016 | Zambetti | G06F 3/0362 | 715/771 |

FOREIGN PATENT DOCUMENTS

| | | |
|---|---|---|
| JP | 2012014524 | 1/2012 |
| JP | 2012168942 | 9/2012 |
| JP | 2012-230571 A | 11/2012 |
| WO | 2009020103 | 2/2009 |
| WO | 2012078665 | 6/2012 |

* cited by examiner

OBJECT STOP POSITION CONTROL METHOD, ACTION INDICATING DEVICE, AND PROGRAM

The entire disclosure of Japanese Patent Application No. 2014-000623 filed on Jan. 6, 2014 including description, claims, drawings, and abstract are incorporated herein by reference in its entirety.

BACKGROUND OF THE INVENTION

Field of the Invention

The present invention relates to an object stop position control method for controlling the stop position when an object on a screen is moved in accordance with a movement instruction from a user, and also to an action indicating device and a program.

Description of the Related Art

In many apparatuses such as a PC (Personal Computer), a tablet, or a multifunction machine, a user interface is employed to receive a movement instruction as to an object (a graphic or a tab of a slide bar) displayed on a display unit from a user through a mouse as a pointing device or a touch panel, and move the object on the screen based on the movement instruction.

There is a demand for a technique of stopping an object precisely at a specific stop position through a simple action performed while the object is moved. For example, as to a slide bar for adjusting sound volume balance between right and left stereophonic outputs, there is a demand for a technique of readily stopping an operation tab at the center of the slide bar. In a case where the object is a graphic, there is a demand for a technique of stopping the object in line with a line in a grid. Also, in a case where a list is scrolled by a flicking action, there is a demand for a technique of stopping the scrolling when the target item is displayed.

As a function to satisfy such a demand, there is a snap function that causes an object to be attracted to a specific stop position and stop at the specific stop position when the object is located within a predetermined distance from the specific stop position.

Also, there is a user interface that has been suggested to lower the scroll speed or stop the scrolling when an item with a designated attribute appears in a case where a list of display items is scrolled (see JP 2012-230571 A, for example).

Where the snap function is used, the object is attracted to the specific stop position even when the user wishes to stop the object at a position slightly away from the specific stop position. Therefore, the object cannot be stopped at a position slightly away from the specific stop position. In such a case, the snap function should be disabled. However, where the snap function is frequently enabled and disabled, operability becomes poorer.

By the method disclosed in JP 2012-230571 A, the stop mode needs to be switched off if the user knows the exact position of the target item or does not wish an automatic stop of the scrolling. In a case where the user wishes to switch on or off the stop mode, it is troublesome for the user to change mode settings by opening the setting screen. Even if a switch button is placed in the same screen, the intended action is interrupted, and operability becomes poorer.

SUMMARY OF THE INVENTION

The present invention is to solve the above problems, and an object of the present invention is to provide an object stop position control method, an action indicating device, and a program that can readily enable and disable the function that causes an object being moved to automatically stop at a predetermined stop position.

The summary of the present invention for achieving the above object lies in the following aspects of the invention.

[1] To achieve the abovementioned object, according to an aspect, an object stop position control method reflecting one aspect of the present invention comprises: when a movement instruction as to an object displayed on a display unit is received by a first operation method, moving the object in accordance with the movement instruction, stopping the movement of the object based on the movement instruction when the object moves past a predetermined stop position, and causing the object to automatically stop at the stop position; and, when the movement instruction is received by a second operation method, not causing the object to automatically stop, but moving the object in accordance with the movement instruction.

In the above Item and Item. 10 described later, the object automatically stops at the predetermined stop position when the object movement instruction is issued by the first operation method, and the object does not automatically stop when the object movement instruction is issued by the second operation method. Accordingly, the automatic stop function can be enabled or disabled without any action other than the issuance of the movement instruction.

[2] The object stop position control method of Item. 1, wherein stop position identification information is preferably displayed at the stop position, and the display form of the stop position identification information or the display form of the stop position identification information and the object preferably reminds the user of one of the first operation method and the second operation method from the other one.

In the above Item and Item. 11 described later, the display form of the stop position identification information displayed at the stop position and the object is such that one of the first operation method and the second operation method reminds the user of the other. The user can be made to intuitively understand how to use the object. For example, if a concave portion is displayed at a predetermined stop position in a case where the object is a spherical object, the user can intuitively understand that the object is engaged with the concave portion and automatically stops when moved slowly, and the object can move past the concave portion when moved quickly. If an obstruction is put at the predetermined stop position and a detour for avoiding the obstruction is displayed, the user understands that the object does not automatically stop when moved through the detour, and the object automatically stops when moved on the side of the obstruction.

[3] The object stop position control method of Item. 2, wherein the display form of the stop position identification information and the object preferably indicates that the object is made to stop at the display position of the stop position identification information by a predetermined physical action.

In the above Item and Item. 12 described later, the automatic stop function is represented by a physical action. The physical action is the gravity, an elastic force, or a magnetic force, for example.

[4] The object stop position control method of any one of Items. 1 to 3, wherein the moving direction of the object based on the movement instruction is preferably determined in advance, and, when an action to move the object in a different direction from the moving direction is received, the stop position is preferably added or deleted at the site where the action is received.

In the above Item and Item. 13 described later, an action to move the object in a different direction from the regular moving direction is performed, so that a stop position can be added at the site, or an existing stop position can be deleted.

[5] The object stop position control method of any one of Items. 1 to 4, wherein, when the movement instruction is received by the second operation method, an indication that the object does not automatically stop is preferably displayed.

In the above Item and Item. 14 described later, when the object is moved by the second operation method, an indication that the automatic stop function is disabled is displayed to the user.

[6] The object stop position control method of any one of Items. 1 to 5, wherein operation is preferably capable of entering a skipping state where the object does not automatically stop even when the movement instruction is received by the first operation method, and, after the operation enters the skipping state, the skipping state is preferably maintained until a predetermined condition for canceling the skipping state is satisfied.

In the above Item and Item. 15 described later, once operation enters the skipping state, the skipping state is maintained until the condition for canceling the skipping state is satisfied. Accordingly, in the skipping state, the object can be readily made to move past stop positions.

[7] The object stop position control method of any one of Items. 1 to 6, wherein the object is preferably a tab of a slide bar or a list to be scrolled.

[8] The object stop position control method of any one of Items. 1 to 7, wherein the stop position is preferably changeable.

In the above Item and Item. 17 described later, stop positions at which the object is to automatically stop can be changed. The stop positions may be automatically changed by the device, or may be changed by the user.

[9] The object stop position control method of any one of Items. 1 to 8, wherein the display unit preferably includes a touch panel on the display surface thereof, and receives the movement instruction through a touching action of a contact object such as a finger on the touch panel.

[10] To achieve the abovementioned object, according to an aspect, an action indicating device reflecting one aspect of the present invention comprises: a display unit; a control unit that controls display of an object on the display unit; and an operation unit that receives a movement instruction as to the object displayed on the display unit from a user, wherein, when receiving the movement instruction as to the object displayed on the display unit by a first operation method, the control unit moves the object in accordance with the movement instruction, stops the movement of the object based on the movement instruction when the object moves past a predetermined stop position, and causes the object to automatically stop at the stop position, and, when receiving the movement instruction by a second operation method, the control unit does not cause the object to automatically stop, and moves the object in accordance with the movement instruction.

[11] The action indicating device of Item. 10, wherein the control unit preferably displays stop position identification information at the stop position, and the display form of the stop position identification information or the display form of the stop position identification information and the object preferably reminds the user of one of the first operation method and the second operation method from the other one.

[12] The action indicating device of Item. 11, wherein the display form of the stop position identification information and the object preferably indicates that the object is made to stop at the display position of the stop position identification information by a predetermined physical action.

[13] The action indicating device of any one of Items. 10 to 12, wherein the moving direction of the object based on the movement instruction is preferably determined in advance, and, when receiving an action to move the object in a different direction from the moving direction, the control unit preferably adds or deletes the stop position at the site where the control unit receives the action.

[14] The action indicating device of any one of Items. 10 to 13, wherein, when receiving the movement instruction by the second operation method, the control unit preferably causes the display unit to display an indication that the object does not automatically stop.

[15] The action indicating device of any one of Items. 10 to 14, wherein the action indicating device is preferably capable of entering a skipping state where the object does not automatically stop even when the movement instruction is received by the first operation method, and, after the action indicating device enters the skipping state, the control unit preferably maintains the skipping state until a predetermined condition for canceling the skipping state is satisfied.

[16] The action indicating device of any one of Items. 10 to 15, wherein the object is preferably a tab of a slide bar or a list to be scrolled.

[17] The action indicating device of any one of Items. 10 to 16, wherein the stop position is preferably changeable.

[18] The action indicating device of any one of Items. 10 to 17, wherein the operation unit preferably includes a touch panel placed on the display surface of the display unit, and receives the movement instruction through a touching action of a contact object such as a finger on the touch panel.

[19] To achieve the abovementioned object, according to an aspect, a non-transitory recording medium storing a computer readable program reflecting one aspect of the present invention causes an information processing device to function as the action indicating device of any one of Items. 10 to 18.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
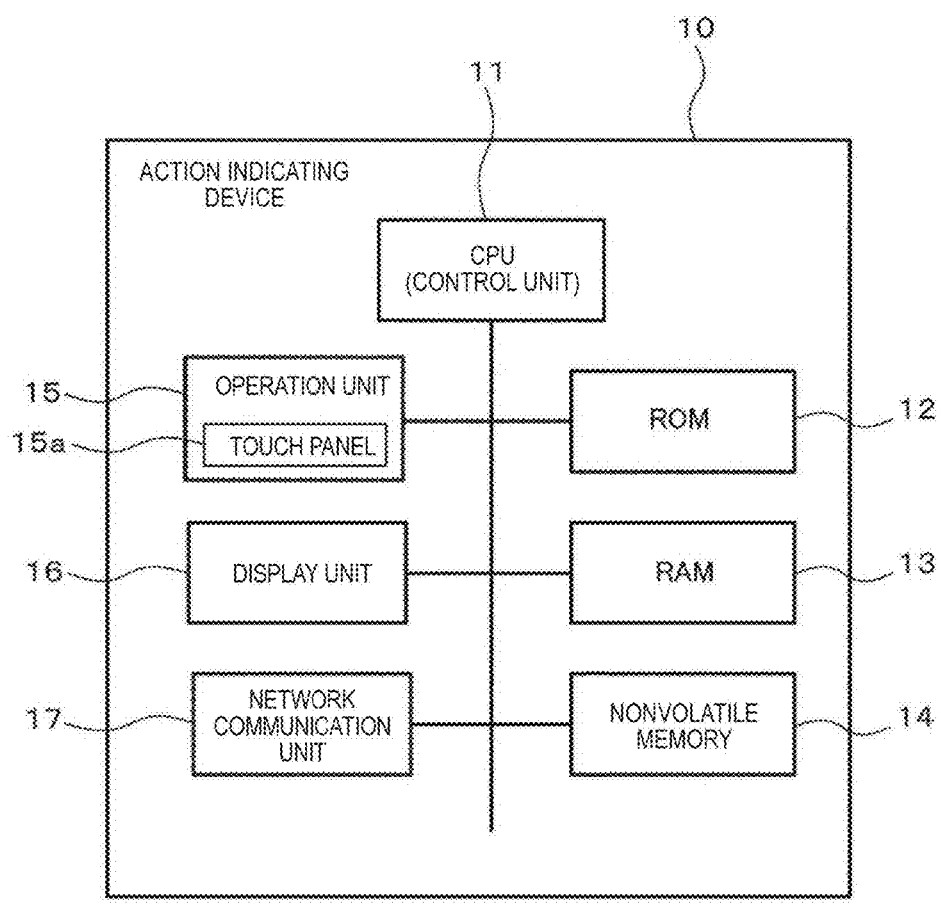
FIG. 1 is a block diagram schematically showing the structure of an action indicating device according to an embodiment of the present invention.

FIG. 1 is a block diagram schematically showing the structure of an action indicating device 10 according to an embodiment of the present invention. The action indicating device 10 includes a CPU (Central Processing Unit) 11 that collectively controls operation of the action indicating device 10. A ROM (Read Only Memory) 12, a RAM (Random Access Memory) 13, a nonvolatile memory 14, an operation unit 15, a display unit 16, and a network communication unit 17 are connected to the CPU 11 via a bus.

The CPU 11 operates based on an OS (Operating System) program, and executes middleware, application programs, and the like.

Various kinds of programs are stored in the ROM 12, and the CPU 11 performs various kinds of processes in accordance with these programs to realize the functions of the action indicating device 10.

The RAM 13 is used as a work memory for temporarily storing various kinds of data when the CPU 11 performs a process based on a program, and for storing display data.

The nonvolatile memory 14 is a memory (flash memory) in which stored contents are not damaged when the power supply is switched off, and is used for storing various kinds of setting information and the like.

The display unit 16 is formed with a liquid crystal display (LCD) or the like, and functions to display desired display contents. The operation unit 15 includes hard keys and a screen-type touch panel 15a placed on the display surface of the display unit 16. The touch panel 15a detects the coordinates of a point pressed with a contact member such as a stylus pen or a finger, a flicking action, a dragging action, or the like. The detection method used by the touch panel 15a may involve capacitance, an analog/digital resistance film, infrared rays, ultrasonic waves, electromagnetic induction, or the like. In the description below, the contact member is a finger.

The network communication unit 17 functions to communicate data with a multifunction machine or some other external device via a network such as a LAN (Local Area Network).

The action indicating device 10 is a remote operation panel of a tablet terminal or a multifunction machine, the operation panel of the main frame of a multifunction machine, or the like. A multifunction machine is an apparatus that has a copy function to optically read a document and print a duplicate image thereof onto a recording paper sheet, a scan function to store image data of a read document as a file or transmit the image data to an external terminal via a network, a printer function to form an image according to print data received from an external PC (Personal Computer) or the like via a network onto a recording paper sheet to print out the image, a facsimile function to transmit/receive image data in accordance with facsimile procedures, and the like.

Figure 2A:
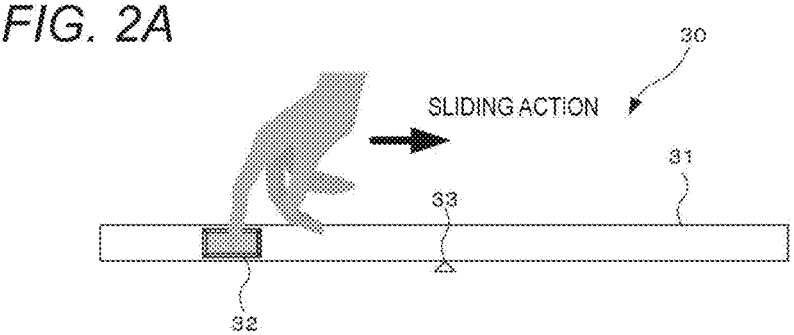
FIGS. 2A to 2C are diagrams showing a situation where a user moves a tab by a first operation method (at a lower movement speed than a threshold value)
Figure 2B:
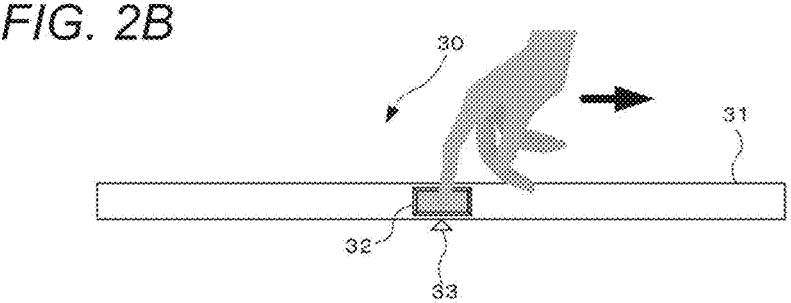
Figure 2C:
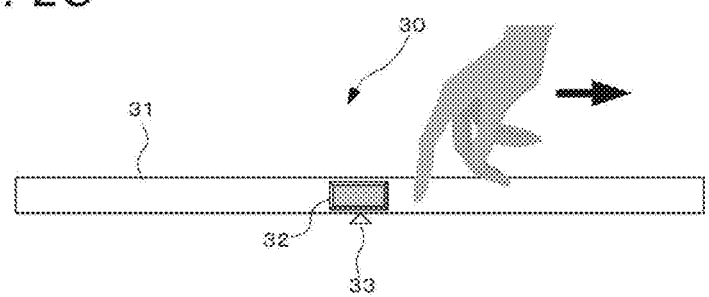

FIGS. 2A to 2C are diagrams for explaining a slide bar 30 displayed on the display unit 16 of the action indicating device 10, and movement of the slide bar 30. The slide bar 30 is formed with a scale portion 31 that shows a simulated straight groove of a predetermined length, and a tab 32 that moves in the scale portion 31. The tab 32 is an object to be moved based on movement instructions.

The slide bar 30 is a user interface for adjusting a desired control parameter (such as copying density). The value of the control parameter is smallest at the left end of the scale portion 31, and is largest at the right end of the scale portion 31, becoming larger in the direction toward the right. The value corresponding to the current position of the tab 32 in the scale portion 31 indicates the current set value of the control parameter.

In this example, a specific stop position 33 is set beforehand at the center of the scale portion 31 in the length direction. When the tab 32 stops at the specific stop position 33, the value of the control parameter is the median of the range in which the control parameter can be adjusted with the slide bar 30.

Upon receipt of a movement instruction from a user with respect to the tab 32 of the slide bar 30 displayed on the display unit 16, the action indicating device 10 moves the tab 32 in accordance with the movement instruction.

Here, a movement instruction is an instruction to touch the touch panel 15a at the display position of the tab 32 with a finger and move the touch point while keeping the finger in contact with the touch panel 15a. The user can move the tab 32 in the scale portion 31 by touching the tab 32 with a finger and moving the finger along the scale portion 31 while keeping the finger in contact with the tab 32.

While a finger is in contact with the touch panel 15a in accordance with the movement instruction, the action indicating device 10 moves the tab 32 in the scale portion 31 so as to follow the finger in contact with the touch panel 15a. When the finger is removed from the touch panel 15a, the tab 32 is stopped at the position where the finger is removed.

However, if the tab 32 (or the finger touch point) moves past the predetermined specific stop position 33 at a lower speed than a threshold value while the tab 32 is being moved in accordance with a movement instruction, the movement of the tab 32 based on the movement instruction from the user is stopped so that the tab 32 automatically stops at the specific stop position 33. If the tab 32 moves past the specific stop position 33 at a speed equal to or higher than the threshold value while the tab 32 is being moved in accordance with a movement instruction, the tab 32 does not automatically stop as described above, but continues to move based on the movement instruction from the user.

That is, the automatic stop function is on when a first operation method of moving the tab 32 at a lower speed than the threshold value is implemented, but is off when a second operation method of moving the tab 32 at a speed equal to or higher than the threshold value is implemented.

FIGS. 2A to 2C show a case where a user touches the tab 32 with a finger and moves the tab 32 from left to right by the first operation method (at a lower movement speed than the threshold value). FIG. 2A shows the situation immediately after the touch and the start of movement. The tab 32 follows the movement of the finger. FIG. 2B shows a situation where the tab 32 has reached the specific stop position 33 and is moving past the specific stop position 33 at a lower speed than the threshold value, and FIG. 2C shows a situation where the tab 32 automatically stops at the specific stop position 33 since the touch point has moved past the specific stop position 33 at a lower speed than the threshold value. Since only the tab 32 stops at the specific stop position 33 though the user continues to move the touching finger, the user feels as if the tab 32 were left behind at the specific stop position 33.

Figure 3A:
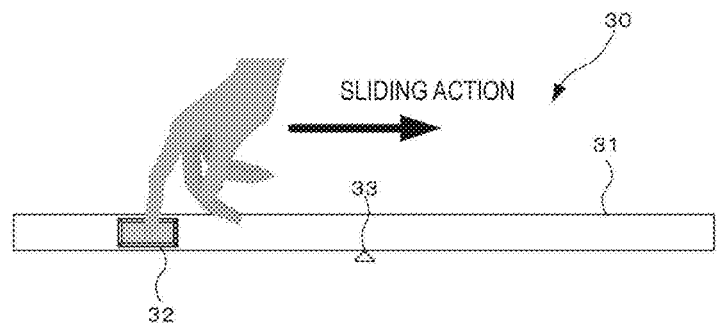
FIGS. 3A to 3C are diagrams showing a situation where a user moves a tab by a second operation method (at a movement speed equal to or higher than the threshold value)
Figure 3B:
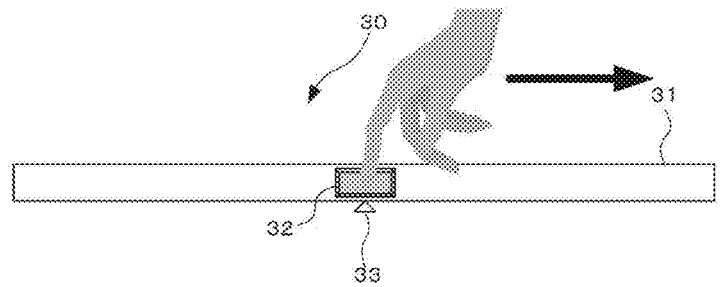
Figure 3C:
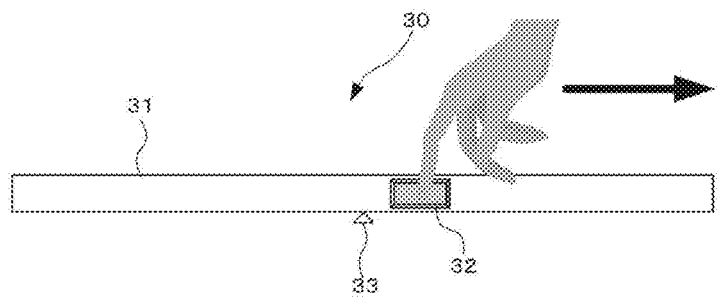

FIGS. 3A to 3C show a case where a user touches the tab 32 with a finger and moves the tab 32 from left to right by the second operation method (at a movement speed equal to or higher than the threshold value). FIG. 3A shows the situation immediately after the touch and the start of movement. The tab 32 follows the movement of the finger. FIG. 3B shows a situation where the tab 32 (the touch point) has reached the specific stop position 33 and is moving past the specific stop position 33 at a speed equal to or higher than the threshold value, and FIG. 3C shows a situation where the tab 32 has not automatically stopped at the specific stop position 33 but continues to follow the movement of the finger and has moved past the specific stop position 33 since the touch point has moved past the specific stop position 33 at a speed equal to or higher than the threshold value.

As described above, a user can determine whether to automatically stop the tab 32 at the specific stop position 33 when the tab 32 is moving past the specific stop position 33, simply by changing the movement speed of the tab 32. Accordingly, the automatic stop function can be enabled and disabled without any other action, and high operability is realized.

If the tab 32 is moved at a lower speed than the threshold value, the tab 32 can be stopped exactly at the predetermined specific stop position 33 when simply moved along the scale portion 31. Even if the movement speed is lower than the threshold value, the tab 32 can be stopped at a position near the specific stop position 33 on a desired side when the user moves the tab 32 toward the specific stop position 33 from a desired direction and removes the finger from the tab 32 so that the tab 32 does not move past the specific stop position 33.

Figure 4:
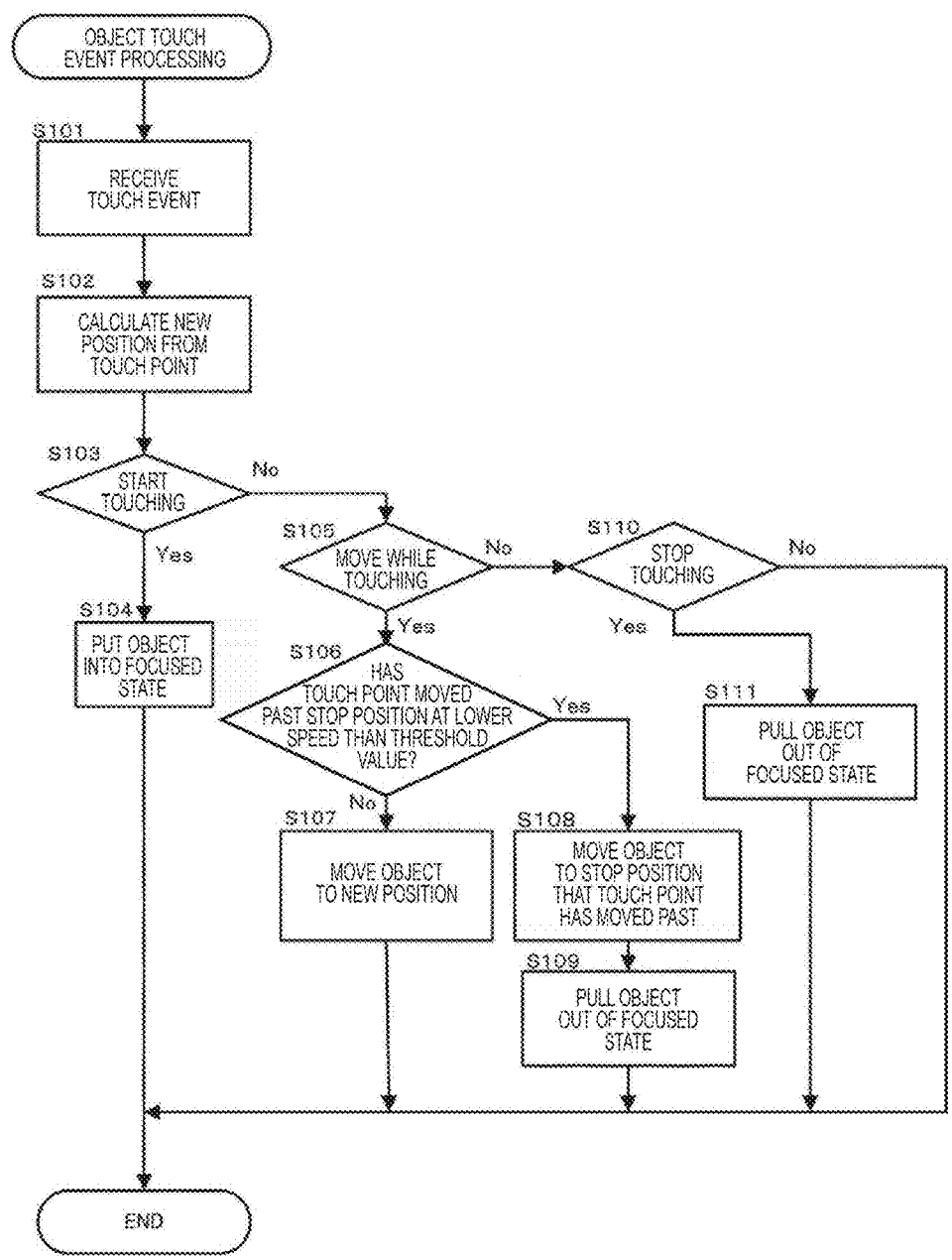
FIG. 4 is a flowchart showing the flow of a process to be performed by the action indicating device.

FIG. 4 shows the flow of a process to be performed by the action indicating device 10. This process is performed every time an event is received from the touch panel 15a. For example, the touch panel 15a detects a touch point of a finger at predetermined sampling intervals (50 ms), and generates an event every time a touch point is detected.

Upon receipt of an event from the touch panel 15a (step S101), the CPU 11 calculates a new touch point of a finger from the touch point indicated by this event (the touch point at the time of the event generation) (step S102).

If the event received this time is a touch start event (an event indicating that a finger newly touches the touch panel 15a) (Yes in step S103), the object is put into a focused state (step S104), and the process comes to an end. A focused state is a state where the object is made to follow the movement of the touching finger. Once put into a focused state, the object is to receive touch events thereafter.

If the event received this time is an event indicating that the finger has moved while keeping in contact with the touch panel 15a (Yes in step S105), a check is made to determine whether the touch point has moved past the specific stop position at a lower speed than the threshold value during the movement (step S106). Whether the touch point has moved past the specific stop position is determined based on whether there is the specific stop position between the object display position and the new touch point.

If the touch point has not moved past the specific stop position at a lower speed than the threshold value (No in step S106), or in a case where the touch point has not moved past the specific stop position or has moved past the specific stop position at a speed equal to or higher than the threshold value, the object is moved to a new touch point (step S107), and this process comes to an end. With this, the object follows the movement of the finger.

In a case where the touch point has moved past the specific stop position at a lower speed than the threshold value (Yes in step S106), the object display position is moved to the specific stop position the touch points has moved past this time (step S108), the object is pulled out of the focused state (step S109), and this process comes to an end. Once pulled out of the focused state, the object is not to receive touch events thereafter. Accordingly, the object is stopped and displayed at the specific stop position, and does not follow the movement of the finger.

If the event received this time is a touch end event (an event indicating that the finger is removed from the touch panel 15a) (Yes in step S110), the object is pulled out of the focused state (step S111), and the process comes to an end. As a result, the object stops at the touch point immediately before the finger is removed.

If step S106 is described as "whether the touch point has moved past the stop position by the first operation method" in this flowchart, this flowchart is generalized, and can be applied to various operation methods described later.

Next, a slide bar in such a display form as to remind the user of one of the first operation method by which the automatic stop function is enabled and the second operation method by which the automatic stop function is disabled from the other one of the two operation methods is described.

Figure 5A:
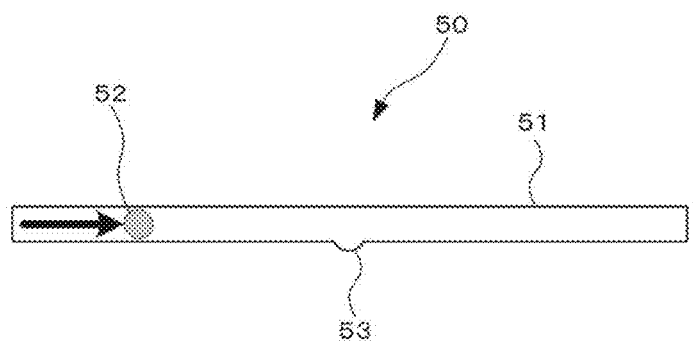
FIGS. 5A and 5B are diagrams for explaining an example of a slide bar and movement of the slide bar that has a spherical tab and a concave portion displayed at a specific stop position.
Figure 5B:
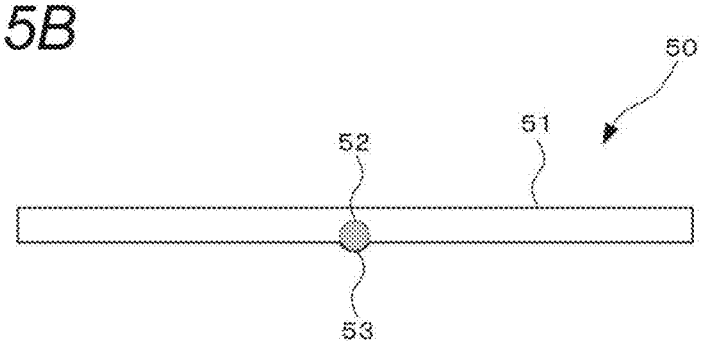

FIGS. 5A and 5B are diagrams for explaining a slide bar 50 and the movement of the slide bar 50 displayed on the display unit 16 of the action indicating device 10. The slide bar 50 is formed with a scale portion 51 that shows a simulated straight groove of a predetermined length, and a spherical object 52 as a tab that moves in the scale portion 51. The spherical object 52 is an object to be moved based on movement instructions.

The slide bar 50 is a user interface for adjusting a desired control parameter (such as copying density). The value of the control parameter is smallest at the left end of the scale portion 51, and is largest at the right end of the scale portion 51, becoming larger in the direction toward the right. The value corresponding to the current position of the spherical object 52 in the scale portion 51 indicates the current set value of the control parameter.

In this example, a specific stop position is set beforehand at the center of the scale portion 51 in the length direction. At the specific stop position, a concave portion 53 with which the spherical object 52 is to be engaged is displayed as stop position identification information. As the display form (design) of the tab is the spherical object 52, and the display form (design) of the stop position identification information is the concave portion 53, the user can intuitively understand that the spherical object 52 is engaged with the concave portion 53 and stops.

Also, as the object to be moved is the spherical object 52, and the stop position identification information is the concave portion 53, the user can think of an operation method of moving the spherical object 52 past the concave portion 53, instead of letting the spherical object 52 be engaged with the concave portion 53.

Figure 6A:
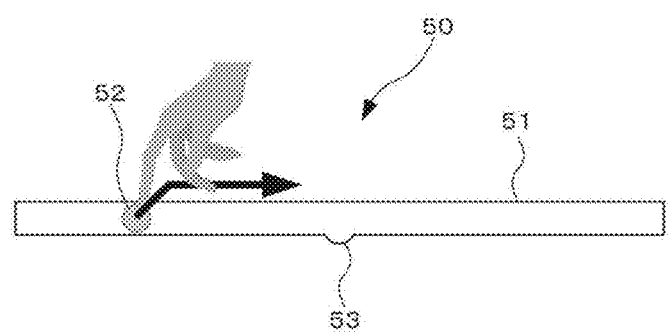
FIGS. 6A and 6B are diagrams showing an example of an action to prevent a spherical object (tab) from being engaged with a concave portion and automatically stopping.
Figure 6B:
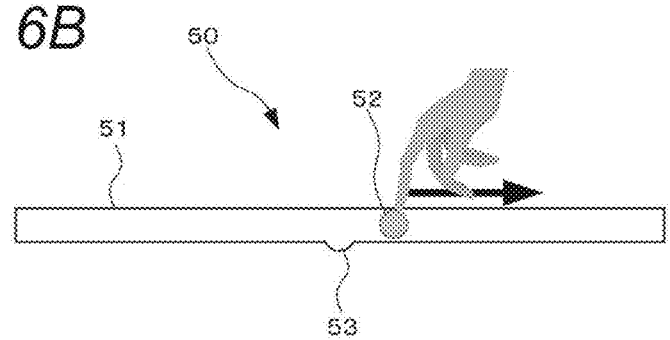

As shown in FIGS. 6A and 6B, for example, the user can easily think of an operation method of pulling the spherical object 52 upward while moving the spherical object 52 so that the spherical object 52 is not engaged with the concave portion 53. Therefore, when the spherical object 52 is moved by such an action, the action indicating device 10 controls the movement of the spherical object 52 so that the spherical object 52 moves past the concave portion 53 without automatically stopping at the concave portion 53. In a case where the spherical object 52 is moved without being pulled upward, the spherical object 52 automatically stops at the concave portion 53.

Figure 7A:
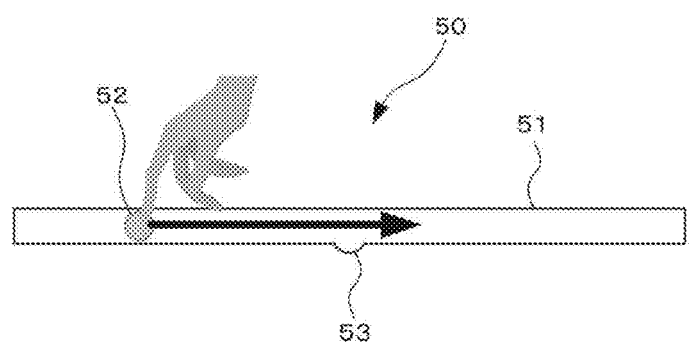
FIGS. 7A and 7B are diagrams showing another example of an action to prevent a spherical object (tab) from being engaged with a concave portion and automatically stopping.
Figure 7B:
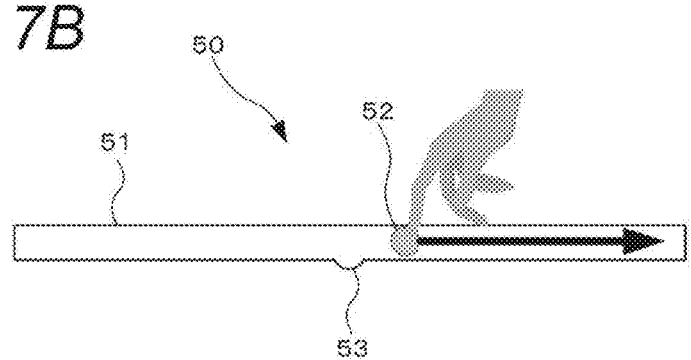

Also, as shown in FIGS. 7A and 7B, for example, the user can easily think of an operation method of moving the spherical object 52 quicker than usual so that the spherical object 52 is not engaged with the concave portion 53. Therefore, when the spherical object 52 is moved quickly (at a speed equal to or higher than the predetermined threshold value), the action indicating device 10 controls the movement of the spherical object 52 so that the spherical object 52 moves past the concave portion 53 without automatically stopping at the concave portion 53. In a case where the spherical object 52 is moved slowly (at a lower speed than the predetermined threshold value), the spherical object 52 automatically stops at the concave portion 53.

Figure 8A:
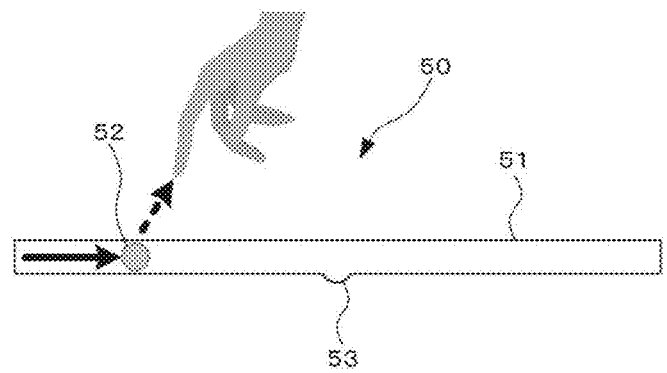
FIGS. 8A to 8C are diagrams showing an example of an action to cause a spherical object (tab) to be engaged with a concave portion and automatically stop, and an action to avoid the automatic stop.
Figure 8B:
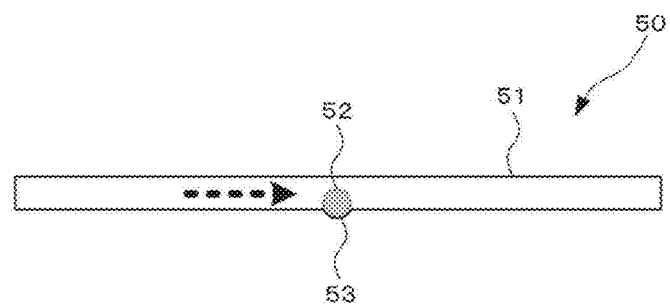
Figure 8C:
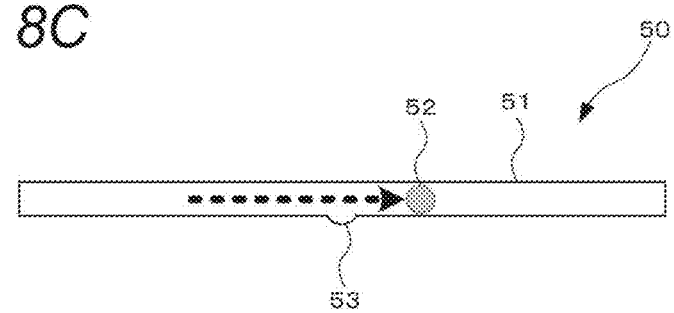

As shown in FIGS. 8A to 8C, in a case where a movement instruction is issued to perform a flicking action to touch the touch panel 15a with a finger at the display portion of the spherical object 52 and then remove the finger from the touch panel 15a in a flicking manner, the spherical object 52 is moved by inertia after the finger is removed. In this case, the movement speed gradually decreases, and becomes zero in the end. If the spherical object 52 is moved by a flicking action, and the movement speed thereof is equal to or lower than the predetermined threshold value when the spherical object 52 reaches the concave portion 53, the user can instinctively understand that the spherical object 52 is engaged with the concave portion 53 and stops.

Therefore, in a case where the spherical object 52 is moved by a flicking action, and the movement speed of the spherical object 52 being moved by inertia is lower than the threshold value when the spherical object reaches the concave portion 53, the action indicating device 10 stops the spherical object 52 at the concave portion 53. If the movement speed of the spherical object 52 being moved by inertial is equal to or higher than the threshold value when the spherical object 52 reaches the concave portion 53, the action indicating device 10 performs control so that the spherical object 52 moves past the concave portion 53 and continues to be moved by inertia.

FIG. 8A shows a situation observed immediately after the spherical object 52 is touched with a finger, is moved a little, and is subjected to a flicking action. FIG. 8B shows a situation where the speed of the spherical object 52 being moved by inertial is lower than the threshold value, and the spherical object 52 is engaged with and stops at the concave portion 53 at the specific stop position. FIG. 8C shows a situation where the speed of the spherical object 52 being moved by inertial is equal to or higher than the threshold value, and the spherical object 52 has moved past the concave portion 53 at the specific stop position.

Although FIGS. 5A to 8C show such display forms that the moving direction of the spherical object 52 is horizontal, and the spherical object 52 is gravitationally engaged with the concave portion 53, it is possible to employ such a display form that the object to be moved by a spring is to be engaged with a concave portion at the specific stop position.

Figures 9A, 9B:
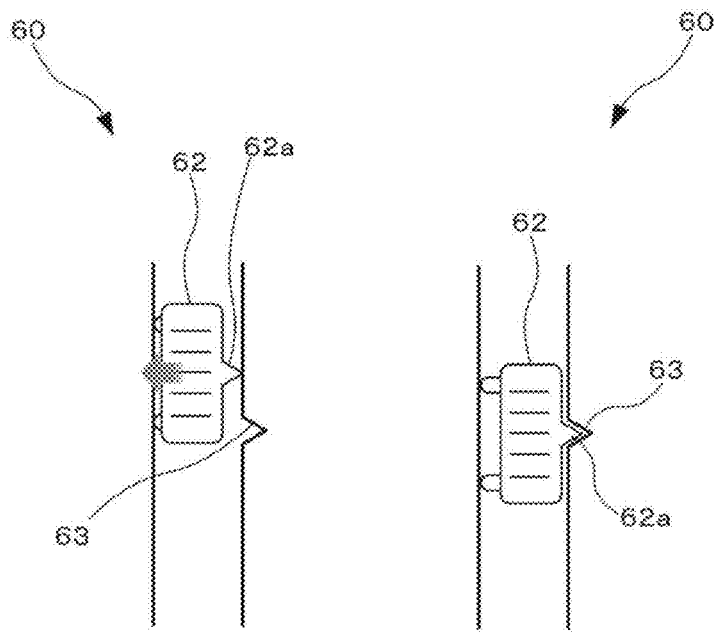
FIGS. 9A and 9B are diagrams showing an example of a vertical slide bar that pushes a tab toward a concave portion by a spring.

For example, FIGS. 9A and 9B show an example of a vertical slide bar 60 in which a tab 62 is pushed toward a concave portion 63 by a spring. In the example shown in FIGS. 9A and 9B, the tab 62 has a protruding portion 62a of the shape corresponding to the shape of the concave portion 63, the protruding portion 62a being located on the surface on the side of the concave portion 63. With such a display form, the user can instinctively understand that the protruding portion 62a of the tab 62 is engaged with the concave portion 63 and stops when the moving tab 62 moves past the specific stop position at which the concave portion 63 is located.

FIG. 9A shows a situation where the tab 62 is located at a position other than the specific stop position, and FIG. 9B shows a situation where the tab 62 is located at the specific stop position, with the protruding portion 62a being engaged with the concave portion 63.

In a case where the tab 62 moves past the concave portion 63 at a lower speed than the threshold value, the action indicating device 10 causes the protruding portion 62a to be engaged with the concave portion 63, so that the tab 62 automatically stops. In a case where the tab 62 moves past the concave portion 63 at a speed equal to or higher than the threshold value, the action indicating device 10 performs control so that the protruding portion 62a is not engaged with the concave portion 63 (or is temporarily engaged with the concave portion 63 but is immediately disengaged from the concave portion 63), and the tab 62 continues to move.

Alternatively, a protrusion may be displayed as the stop position identification information at the specific stop position, and a concave portion to be engaged with the protrusion may be formed on (the tab side of) the object to be moved.

In the above examples, the objects such as the tab 32 and the spherical object 52 are one-dimensionally moved, but these objects may be two-dimensionally moved.

Figure 10:
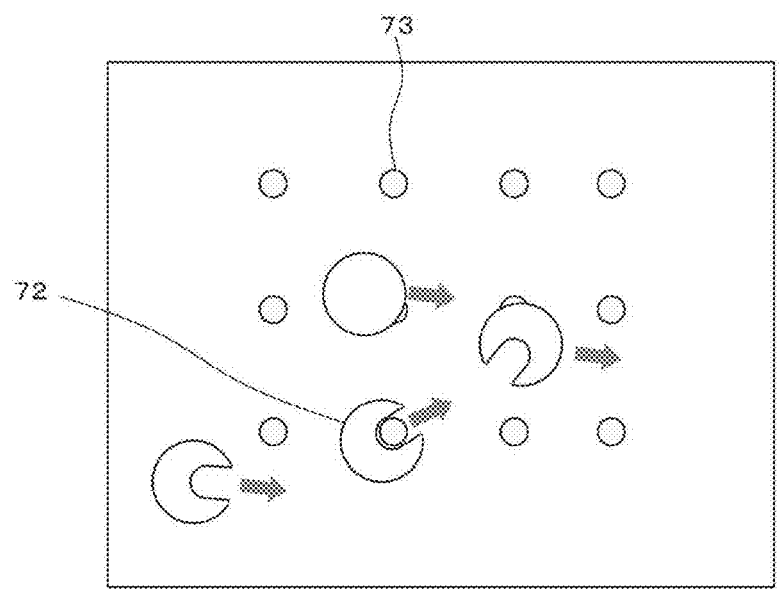
FIG. 10 is a diagram showing an example case where an object can be two-dimensionally moved.

FIG. 10 shows an example case where an object can be two-dimensionally moved. At specific stop positions, columns 73 are displayed as the stop position identification information. In a normal state, an object 72 to be moved has a disk-like shape with a concave portion that has a shape with which a column 73 can be engaged, and is open in the moving direction. When a column 73 is engaged with the concave portion that is open in the moving direction, the object automatically stops at the corresponding specific stop position.

When moving the object 72, the user can rotate the object 72 by a pinching action and move the object 72 in such a manner that the opening does not face any column 73, or the user can close the concave portion with two fingers and then move the object 72. That is, when the object 72 is moved by the first operation method by which the object 72 is moved with the concave portion facing in the moving direction, the automatic stop function is enabled. When the object 72 is moved by the second operation method by which the object 72 is moved with the concave portion being closed or the second operation method by which the object 72 is moved with the concave portion facing in a different direction from the moving direction, the automatic stop function is disabled. The automatic stop function is enabled when the object 72 is moved by the first operation method, and is disabled when the object 72 is moved by the second operation method. Accordingly, the object 72 can be switched between automatically stopping at a specific stop position and not stopping at any specific stop position, without any action other than issuance of a movement instruction.

Next, an action to be performed by a user to add or delete a specific stop position is described.

The moving direction of an object based on a movement instruction from the user is determined in advance. When an action to move the object in a different direction from this moving direction is received, a specific stop position is added or deleted at the site where the action has been received.

Figure 11A:
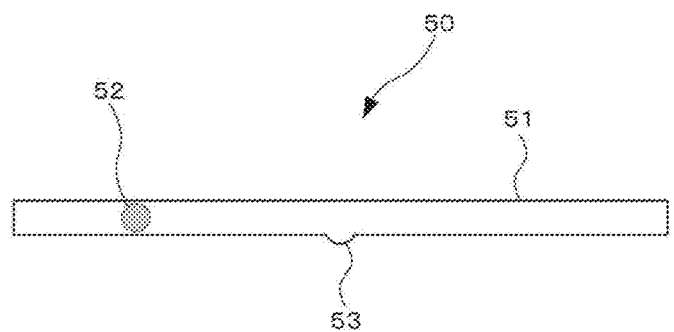
FIGS. 11A to 11C are diagrams showing an action to add a specific stop position.
Figure 11B:
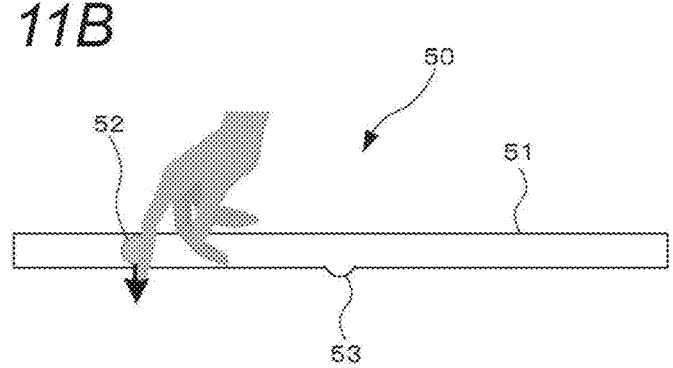
Figure 11C:
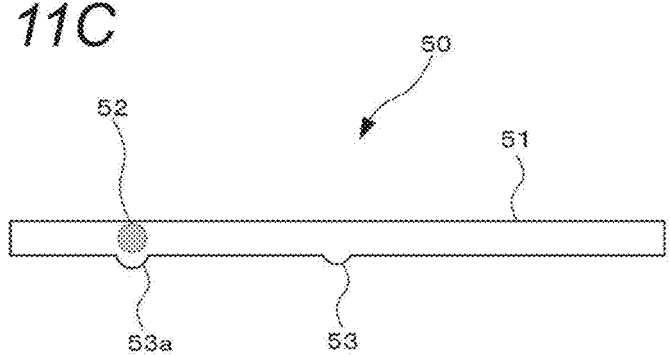

In an example of the slide bar 50 shown in FIGS. 11A to 11C, the spherical object 52 as the tab moves in the longitudinal direction of the scale portion 51 (in the horizontal direction in the drawings) in accordance with a regular movement instruction (an instruction to move the tab from left to right or from right to left). When the user performs an action to move the spherical object 52 in a different direction (the vertical direction in this case) from the regular moving direction, a specific stop position is added or deleted at the side where the action has been received.

As shown in FIG. 11B, when the user performs an action to push down the spherical object 52 at a position hard enough to pull the spherical object 52 downward from the scale portion 51, a new specific stop position is added at the site. In this example, a new concave portion 53a is formed, as shown in FIG. 11C. The operation to form a concave portion by pushing an object downward is similar to the way of forming a concave portion in nature, and accordingly, the user can intuitively understand the method of forming a concave portion.

Figure 12A:
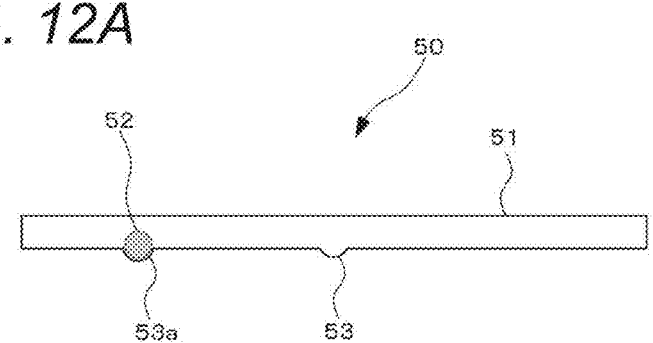
FIGS. 12A to 12C are diagrams showing an action to delete a specific stop position.
Figure 12B:
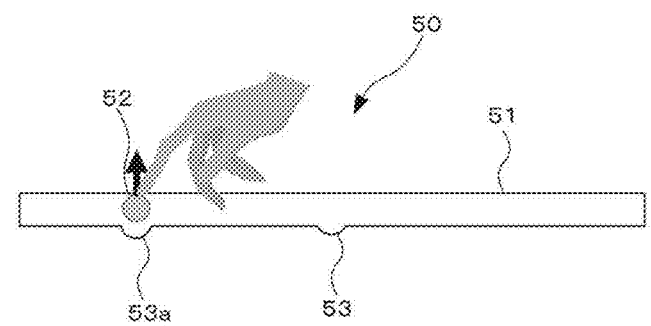
Figure 12C:
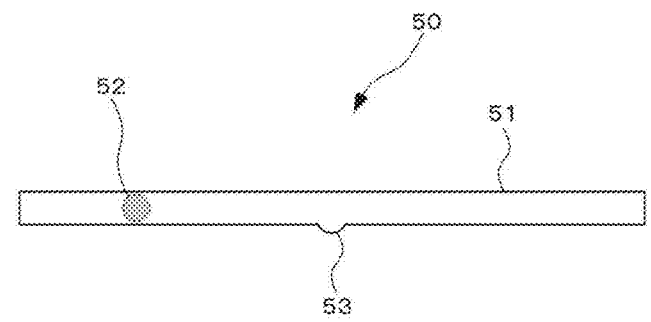

As shown in FIG. 12B, when the user performs an action to push up the spherical object 52 engaged with an existing concave portion 53a hard enough to pull the spherical object 52 upward from the scale portion 51, the specific stop position is deleted. In this example, the action shown in FIG. 12B is performed, the concave portion 53a located at the site is deleted (see FIG. 12C). As this action is the opposite of the action performed in the adding case, the user can intuitively understand the method of deleting a concave portion.

As described above, by performing a simple action, the user can add a new specific stop position at a desired site, or delete an existing specific stop position.

Next, an example case where the automatic stop function being disabled is indicated when a movement instruction according to the second operation method is received is described.

Figure 13A:
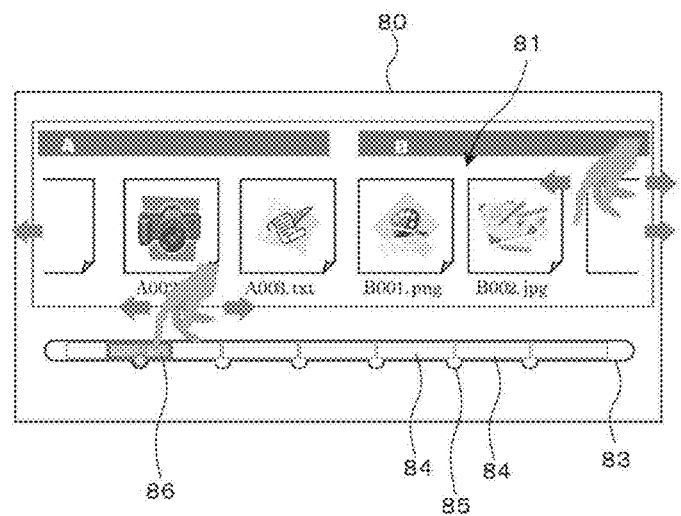
FIGS. 13A and 13B are diagrams showing an example of a file select screen for selecting a file to be processed.

FIG. 13A shows an example of a file select screen 80 for displaying a list of icons corresponding to files in a scrolling manner, and selecting a file to be processed. In the file select screen 80, files sorted out in alphabetical order based on the file names are displayed in the form of respective icons in a scroll area 81 that horizontally scrolls, and a slide bar 83 interlocking with the current scroll position is displayed in a lower portion. In the slide bar 83, areas 84 associated with the respective categories are displayed, and specific stop positions are displayed as concave portions 85 at the boundary positions between the categories (the areas 84).

The user may operate a tab 86 of the slide bar 83, or may scroll the icon list at a desired position in the scroll area 81.

Figure 13B:
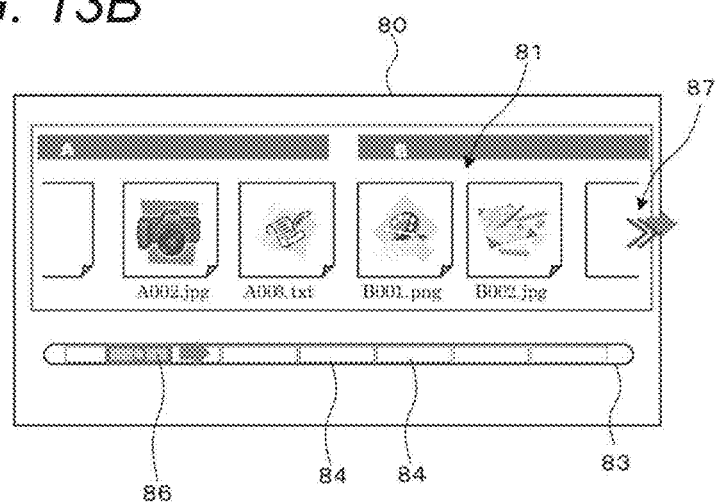

As shown in FIG. 13B, in a case where the user performs an action to select not to enable the automatic stop function (an action such as adjusting the scroll speed to a speed equal to or higher than a certain speed, performing a rightward flicking action twice in a row, or not removing a finger until the finger moves out of the area after flicking), the action indicating device 10 indicates, to the user, that the automatic stop function is disabled. For example, the automatic stop function being disabled is indicated by a display form of the icons, the tab 86, or the specific stop positions (the concave portions 85).

In FIG. 13B, the automatic stop function being disabled is indicated by display of a double-lined arrow 87 on an icon and deletion of all the concave portions 85. The tab 86 in FIG. 13B has such a display form that the spherical portion is housed in the tab 86, and indicates that the spherical object is not engaged with any concave portion 85 and does not automatically stop.

Next, a skipping state where the automatic stop function is not enabled even when a movement instruction according to the first operation method is received is described.

In a case where specific stop positions exist before a target position, operation might become cumbersome if the object is made to move past all the specific stop positions by the second operation method on the way to the target position. Therefore, a skipping state where the automatic stop function is not enabled even when the object is moved by the first operation method is employed. Once put into a skipping state, the action indicating device 10 is maintained in the skipping state until a predetermined condition for canceling is satisfied. That is, the automatic stop function is off until the skipping state is canceled.

Figure 14:
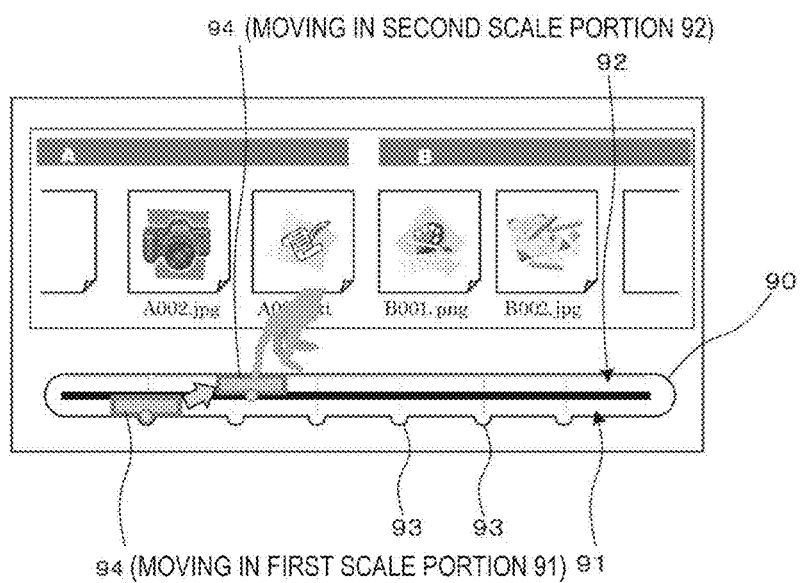
FIG. 14 is a diagram showing an example of a file select screen that has a slide bar formed with the two stages of an upper scale portion and a lower scale portion.

FIG. 14 shows an example of a slide bar 90 having a first scale portion 91 and a second scale portion 92 that are formed as the two portions of an upper portion and a lower portion. The first scale portion 91 as the lower portion has concave portions 93 indicating specific stop positions, and the second scale portion 92 as the upper portion does not have concave portions indicating second scale portions. The user can not only move a tab 94 in the horizontal direction, but also move the tab 94 from the first scale portion 91 to the second scale portion 92 or from the second scale portion 92 to the first scale portion 91 while moving the tab 94 in the horizontal direction or suspending the movement in the horizontal direction. The tab 94 is maintained in the current position in terms of the vertical direction and does not move up or down before the next action to move the tab 94 up or down is received or the screen is reset.

In a state where the tab 94 moves horizontally in the first scale portion 91, the spherical portion of the tab 94 is engaged with a concave portion 93 at a specific stop position so that the tab 94 automatically stops at the specific stop position in this display form. In the state where the tab 94 moves horizontally in the first scale portion 91, the action indicating device 10 indicates that the spherical portion of the tab 94 is engaged with a concave portion 93 when the tab 94 moves past the corresponding specific stop position, and the tab 94 automatically stops at the specific stop position.

In a state where the tab 94 moves horizontally in the second scale portion 92, the action indicating device 10 indicates that the tab 94 does not automatically stop. In the state where the tab 94 moves horizontally in the second scale portion 92, the action indicating device 10 moves the tab 94 in accordance with a movement instruction from the user, and does not perform control to cause the tab 94 to automatically stop at a specific stop position.

The user can determine whether to enable the automatic stop function by moving the tab 94 up or down. The user can also operate the action indicating device 10, with the automatic stop function being kept enabled or disabled while the tab 94 is moved only in the horizontal direction.

Next, other example forms of display of stop position identification information and the like are described.

The forms of display of the stop position identification information indicating a specific stop position and an object to be moved are not limited to a concave portion and a shape matching the concave portion. These display forms indicate that an object to be moved is to stop at the display position (specific stop position) of stop position identification information by virtue of some physical action, and cause the user to recognize an operation method of moving the object past the display position of the stop position identification information by avoiding the physical action.

Figure 15A:
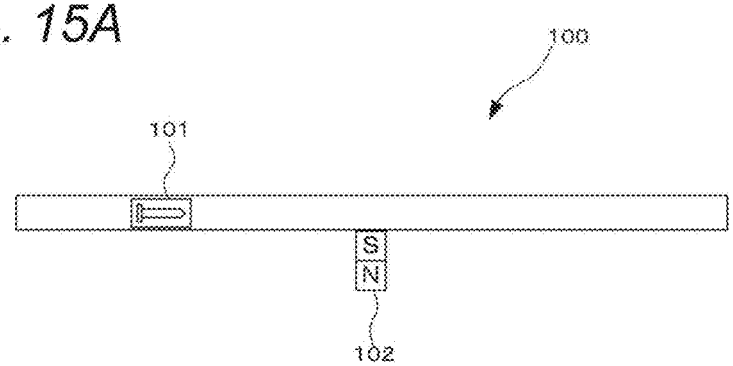
FIGS. 15A and 15B are diagrams showing an example of a slide bar that has a tab to automatically stop at a specific stop position by virtue of a magnetic force.
Figure 15B:
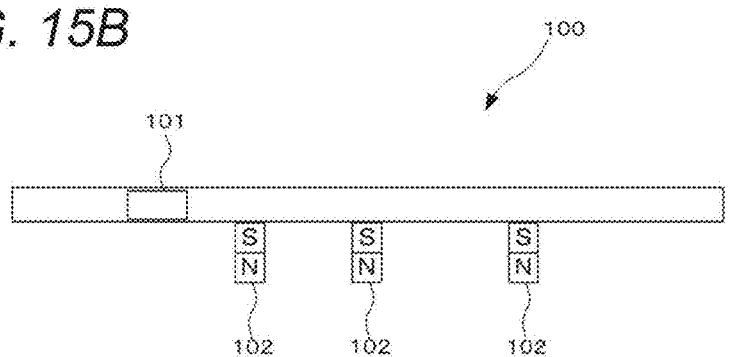

FIGS. 15A and 15B show an example of a slide bar 100 indicating whether an object automatically stops by virtue of a magnetic action that is a physical action. A tab 101 represents a nail, and a magnet 102 is displayed as stop position identification information at a specific stop position. In such a display form, when the tab 101 is slowly moved, the tab 101 is attracted to the magnet 102, and then automatically stops. When the tab 101 is quickly moved, the tab 101 can move past the magnet 102 (does not automatically stop) in spite of attraction of the magnet 102. These features are intuitively understood by the user.

By the first operation method by which the tab 101 is moved with one finger, the nail is displayed, and the automatic stop function is enabled. By the second operation method by which the tab 101 is moved with two fingers, the display of the nail disappears, and the automatic stop function is disabled. When the user moves the tab 101 with one finger, the automatic stop function is enabled. When the user moves the tab 101 with two fingers, the automatic stop function is disabled. These features can be intuitively understood based on whether the nail is displayed. The automatic stop function is enabled when the tab 101 is moved by the first operation method, and is disabled when the tab 101 is moved by the second operation method. Accordingly, the tab 101 can be switched between automatically stopping at a specific stop position and not stopping at any specific stop position, without any action other than issuance of a movement instruction.

When the tab 101 is subjected to a specific action such as tapping of the tab 101, the image of the nail in the tab 101 disappears or appears. As shown in FIG. 15B, where the image of the nail is not displayed, the operation is put into a skipping state, and the automatic stop function is kept disabled.

Figure 16A:
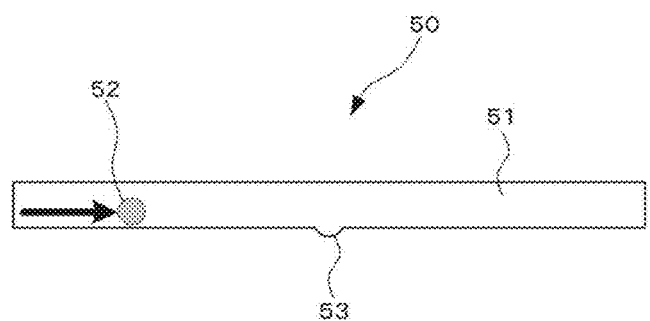
FIGS. 16A and 16B are diagrams showing an example of a slide bar that is designed to change the size of a spherical object so as to enable or disable the automatic stop function of a spherical object being engaged with a concave portion.
Figure 16B:
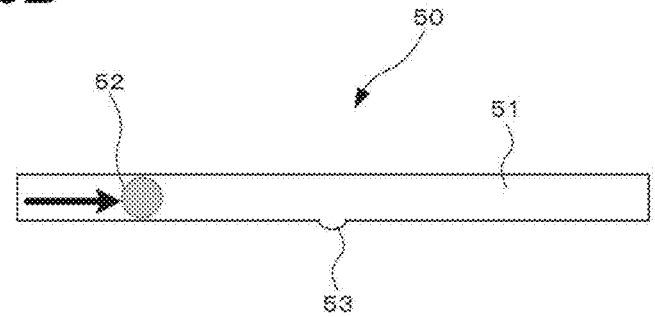

FIGS. 16A and 16B show an example case where whether the automatic stop function is enabled is indicated by the size of a spherical object 52 as the tab. As shown in FIG. 16A, when the size of the spherical object 52 is small, the spherical object 52 is engaged with a concave portion 53, and automatically stops. As shown in FIG. 16B, when the size of the spherical object 52 is large, on the other hand, the spherical object 52 is not engaged with the concave portion 53, and does not automatically stop. From the relationship between the size of the spherical object 52 and the size of the concave portion 53, the user can intuitively understand whether the automatic stop function is enabled.

For example, by the first operation method by which the spherical object 52 is moved with one finger, the spherical object 52 is displayed in a small size, and the automatic stop function is enabled before movement. By the second operation method by which the spherical object 52 is moved with two fingers, on the other hand, the spherical object 52 is displayed in a large size, and the automatic stop function is disabled before movement. When the user moves the spherical object 52 with one finger, the automatic stop function is enabled. When the user moves the spherical object 52 with two fingers, the automatic stop function is disabled. These features can be intuitively understood from the relationship between the size of the spherical object 52 and the size of the concave portion 53. The automatic stop function is enabled when the spherical object 52 is moved by the first operation method, and is disabled when the spherical object 52 is moved by the second operation method. Accordingly, the spherical object 52 can be switched between automatically stopping at a specific stop position and not stopping at any specific stop position, without any action other than issuance of a movement instruction.

The skipping state can also be switched on and off by changing the size of the spherical object 52 by a pinching action or the like. Specifically, the skipping state is switched on when the size of the spherical object 52 is made larger by a pinching action or the like, and the skipping state is maintained until an action to make the spherical object 52 smaller by a pinching action is received.

Figure 17A:
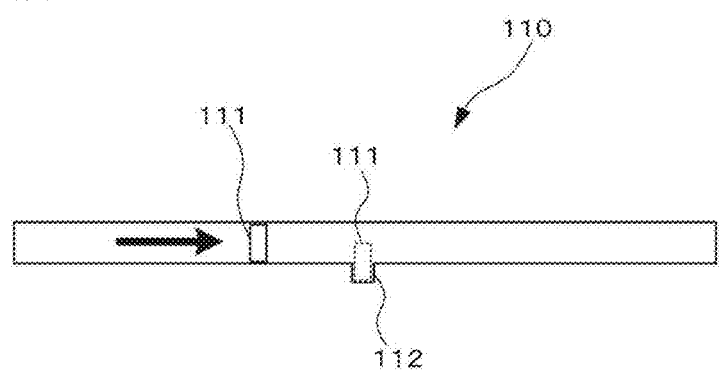
FIGS. 17A and 17B are diagrams showing an example of a slide bar that enables or disables the automatic stop function by switching the orientation of a rectangular tab between a vertical orientation and a horizontal orientation, the rectangular tab being to be engaged with a concave portion when adjusted to a vertical position.
Figure 17B:
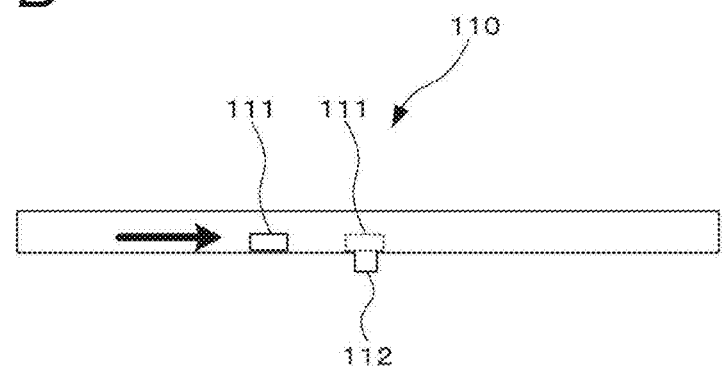

FIGS. 17A and 17B show an example case where the skipping state is switched on and off by adjusting a rectangular tab 111 to a vertical position or a horizontal position. The user can move the rectangular tab 111 after adjusting the tab 111 to a vertical position, or move the tab 111 after adjusting the tab 111 to a horizontal position. As shown in FIG. 17A, by the first operation method by which the rectangular tab 111 in a vertical position is moved, the rectangular tab 111 is engaged with a concave portion 112, and automatically stops. As shown in FIG. 17B, by the second operation method by which the rectangular tab 111 in a horizontal position is moved, on the other hand, the rectangular tab 111 is not engaged with the concave portion 112, and does not automatically stop. The automatic stop function is enabled when the tab 111 is moved by the first operation method, and is disabled when the tab 111 is moved by the second operation method. Accordingly, the tab 111 can be switched between automatically stopping at a specific stop position and not stopping at any specific stop position, without any action other than issuance of a movement instruction.

Alternatively, the position of the tab 111 may be switched between horizontal and vertical by a special-purpose switch or the like, so that the skipping state is switched on and the automatic stop function is continuously disabled when the tab 111 is adjusted to a horizontal position. The skipping state is maintained until the tab 111 is returned to a vertical position by the special-purpose switch. From the relationship between the orientation of the rectangular tab 111 and the size of the concave portion 112, the user can intuitively recognize whether the skipping state is on. The user can also intuitively understand the method of enabling and disabling the automatic stop function (switching the orientation of the rectangular tab 111 between a horizontal orientation and a vertical orientation).

Next, examples of display forms to cause a user to recognize whether to enable the automatic stop function by a method not involving a physical action is described.

Figure 18A:
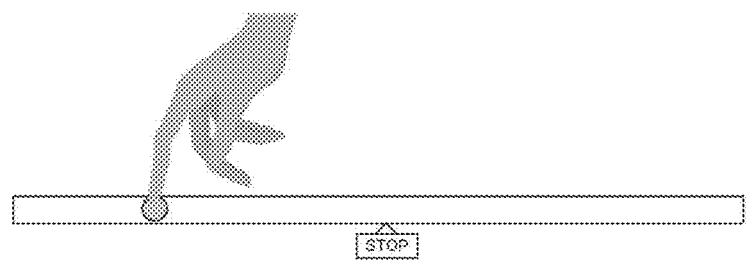
FIGS. 18A to 18C are diagrams showing examples of slide bars indicating whether to enable the automatic stop function verbally or through a design that can be understood in light of common sense.

FIG. 18A shows an example case where the user is verbally made to recognize whether the automatic stop function is enabled, and a sign "STOP" in text is displayed as the stop position identification information at a specific stop position. For example, the "STOP" sign is displayed in text when the tab is moved with one finger (or is moved by the first operation method), and the "STOP" sign in text disappears when the tab is moved with two fingers (or is moved by the second operation method). When the user moves the tab with one finger, the automatic stop function is enabled. When the user moves the tab with two fingers, the automatic stop function is disabled. These features can be intuitively understood based on whether the "STOP" sign is displayed. The automatic stop function is enabled when the tab is moved by the first operation method, and is disabled when the tab is moved by the second operation method. Accordingly, the tab can be switched between automatically stopping at a specific stop position and not stopping at any specific stop position, without any action other than issuance of a movement instruction.

Figure 18B:
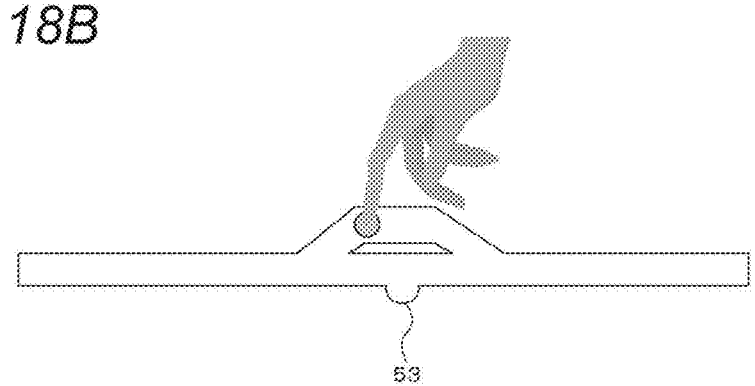

Further, as shown in FIG. 18B, a detour for avoiding a specific stop position (a concave portion 53) may be set. With such a detour, the user can intuitively understand that the tab does not automatically stop when moved through the detour, and the tab automatically stops when not moved through the detour.

Figure 18C:
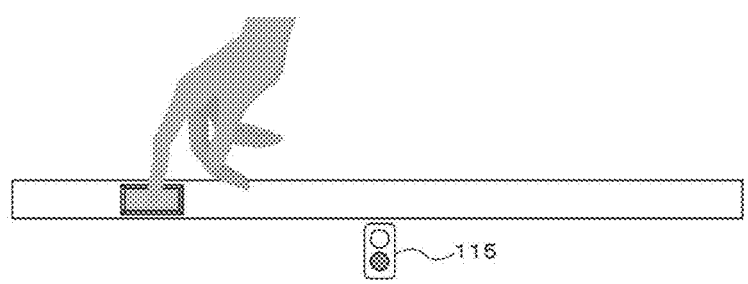

FIG. 18C shows an example case where the user is made to recognize whether to make the tab automatically stop in light of common sense or conventional wisdom. In this example, a signal light 115 is displayed as the stop position identification information. The user recognizes that the tab automatically stops when the signal light is "red", and recognizes that the tab does not automatically stop when the signal light is "blue". For example, the signal light turns red when the tab is moved with one finger (or is moved by the first operation method), and the signal light turns blue when the tab is moved with two fingers (or is moved by the second operation method). When the user moves the tab with one finger, the automatic stop function is enabled. When the user moves the tab with two fingers, the automatic stop function is disabled. These features can be intuitively understood from the display form of the signal light. The automatic stop function is enabled when the tab is moved by the first operation method, and is disabled when the tab is moved by the second operation method. Accordingly, the tab can be switched between automatically stopping at a specific stop position and not stopping at any specific stop position, without any action other than issuance of a movement instruction.

Also, switching on and off of the skipping state can be indicated by switching all the signal lights between red and blue every time the tab is tapped. Furthermore, the automatic stop function can be enabled or disabled at each specific stop position by switching each corresponding signal light between red and blue every time the signal light is tapped.

Next, setting of specific stop positions is described.

Specific stop positions can be set beforehand on the device side, can be automatically set by the device in accordance with some operation conditions or the like, or can be set at desired positions by a user.

Figure 19:
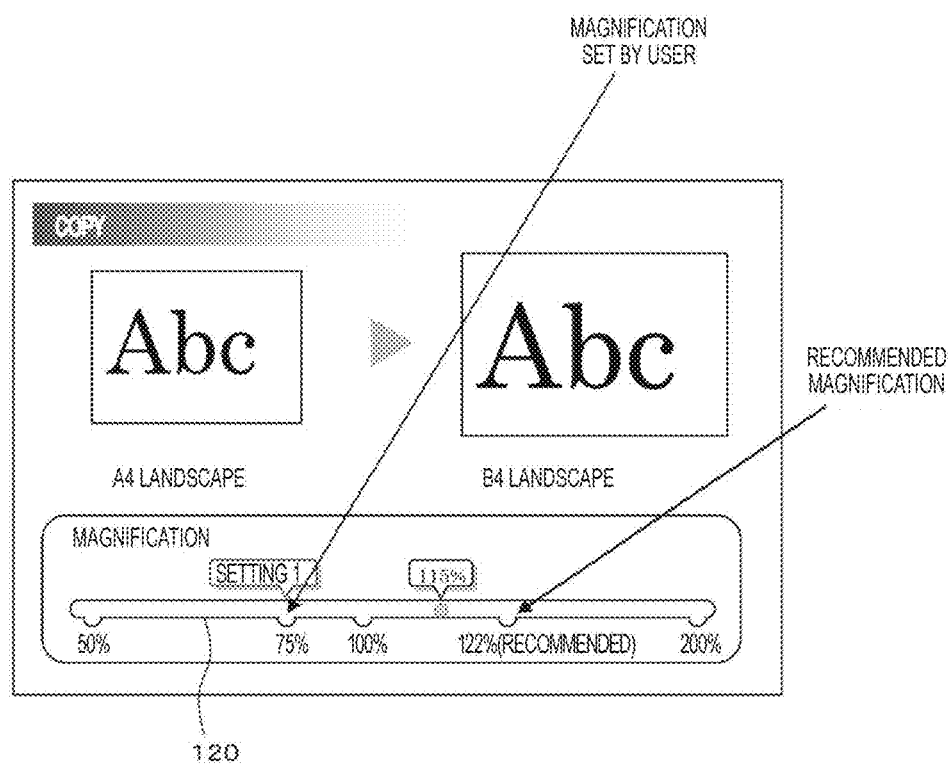
FIG. 19 is a diagram showing an example of a slide bar for setting a copy magnification on a multifunction machine.

FIG. 19 shows an example of a slide bar 120 for setting a copy magnification on a multifunction machine. In this example, specific stop positions are set beforehand at the positions of the lowest magnification (50%), the highest magnification (200%), and the same magnification (100%). In addition to them, specific stop positions are set at the respective positions of a recommended magnification that varies with a combination of an original to be copied and an output paper sheet, and a desired magnification registered by the user.

As described above, when an object is moved according to the present invention, the automatic stop function is enabled by issuing a movement instruction based on the first operation method, and the object can be made to stop accurately and readily at a predetermined stop position (a specific stop position). If a movement instruction is issued based on the second operation method, on the other hand, the automatic stop function is disabled, and the object can be made to move without automatically stopping at a specific stop position.

Also, since display forms of stop position identification information and an object are such that a user can think of one of the first operation method and the second operation method from the other one, the user can intuitively understand what action should be performed to enable or disable the automatic stop function. Accordingly, there is no need for the user to learn operation methods from a manual or a guidance, and higher user-friendliness is achieved. Particularly, with a display form to cause an object to automatically stop by virtue of a physical action, the user can understand whether the automatic stop function is enabled by the same law as the law of nature.

Also, as an action to move an object in a different direction from a regular moving direction is performed, a stop position can be added at the site, or an existing stop position can be deleted. Accordingly, stop positions can be added or deleted by a simple action.

Furthermore, an indication that the automatic stop function is disabled when an object is moved by the second operation method is displayed to the user, the user can check whether an action performed by himself/herself is an action based on the second operation method as intended. The method of displaying, to the user, an indication that the automatic stop function is disabled when the object is moved by the second operation method is not limited to a method of displaying such an indication through a display form of the object to be moved or the stop position identification information, and such an indication may be displayed by text or the like.

Once the device is put into the skipping state, the automatic stop function is disabled until the skipping state is canceled. Accordingly, even if there are specific stop positions on the way to a target position, the object can be moved smoothly to the target position. For example, the object may be moved in the skipping state until immediately before the target position, and be then moved by the first operation method after the skipping state is canceled. In this manner, the object can be prevented from automatically stopping at unnecessary specific stop positions, and be made to automatically stop at the target specific stop position.

Although embodiments of the present invention have been described so far with reference to the accompanying drawings, specific structures are not limited to those embodiments, and modifications and additions within the scope of the invention are included in the present invention.

For example, the types of object movement instructions (operation methods) are not limited to the examples described as the embodiments. Also, movement instructions are not necessarily received through the touch panel 15a. For example, an action related to a movement instruction may be received from a user through a key operation or a mouse as a pointing device. For example, it is possible to employ an operation method by which a movement speed is designated by consecutive tapping on hard keys.

An object to be moved may be a figure, a character, an input box into which text is to be input, or the like.

According to the abovementioned embodiments of the present invention, with an object stop position control method, an action indicating device, and a program according to an embodiment of the present invention, it is possible to readily enable and disable the function that causes an object being moved to automatically stop at a predetermined stop position.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An object stop position control method comprising:
in response to detecting that a movement instruction as to an object displayed on a display unit is received by a first operation method wherein the movement instruction moves past an entirety of a predetermined stop position at a speed lower than a predetermined speed, moving the object in accordance with the movement instruction, stopping the movement of the object based on the movement instruction in response to detecting that the object moves to a predetermined stop position, and causing the object to automatically stop at the predetermined stop position; and,
in response to detecting that the movement instruction is received by a second operation method wherein the movement instruction moves past the entirety of the predetermined stop position at a speed equal to or higher than the predetermined speed, not causing the object to automatically stop, but moving the object in accordance with the movement instruction;
wherein an operation mode enters a skipping state where the object does not automatically stop at the predetermined stop position even when the movement instruction is received by the first operation method, by changing a display form of the object from a first display form to the second display form where a size of the first display form is smaller than a size of the second display form,
wherein the first display form of the object is obtained in response to detecting a first number of touch inputs providing the movement instruction, and the second display form of the object is obtained in response to detecting a second number of touch inputs different from the first number providing the movement instruction,
wherein the size of the first display form corresponds to a size of another object at the predetermined stop position, and
after the operation mode enters the skipping state, the skipping state is maintained until the display form of the object is changed from the second display form to the first display form.

2. The object stop position control method according to claim 1, wherein the first display form of the object indicates that the object is made to stop at a display position of the stop position identification information by a predetermined physical action; and
wherein the second display form of the object indicates that the object is not made to stop at the display position of the stop position identification information by the predetermined physical action.

3. The object stop position control method according to claim 1,
wherein a moving direction of the object based on the movement instruction is determined in advance, and,
in response to detecting that an action to move the object in a direction orthogonal from the moving direction, an additional stop position is added at a site where the action is received when no stop position exists at the site, and an existing stop position is deleted at the site where the action is received when the existing stop position is at the site.

4. The object stop position control method according to claim 1, wherein stop position identification information is displayed at the stop position, and one of a display form of the stop position identification information and the object reminds the user of one of the first operation method and the second operation method from the other one.

5. The object stop position control method according to claim 1, wherein the display form of the stop position identification information and the object indicates that the object is made to stop at a display position of the stop position identification information by a predetermined physical action.

6. The object stop position control method according to claim 1, wherein, when the movement instruction is received by the second operation method, an indication that the object does not automatically stop is displayed.

7. The object stop position control method according to claim 1, wherein after the operation enters the skipping state, the skipping state is maintained until a predetermined condition for canceling the skipping state is satisfied.

8. The object stop position control method according to claim 1, wherein the object is one of a tab of a slide bar and a list to be scrolled.

9. The object stop position control method according to claim 1, wherein the stop position is changeable.

10. The object stop position control method according to claim 1, wherein the display unit includes a touch panel on a display surface thereof, and receives the movement instruction through a touching action of a contact object such as a finger on the touch panel.

* * * * *